Figure 1:
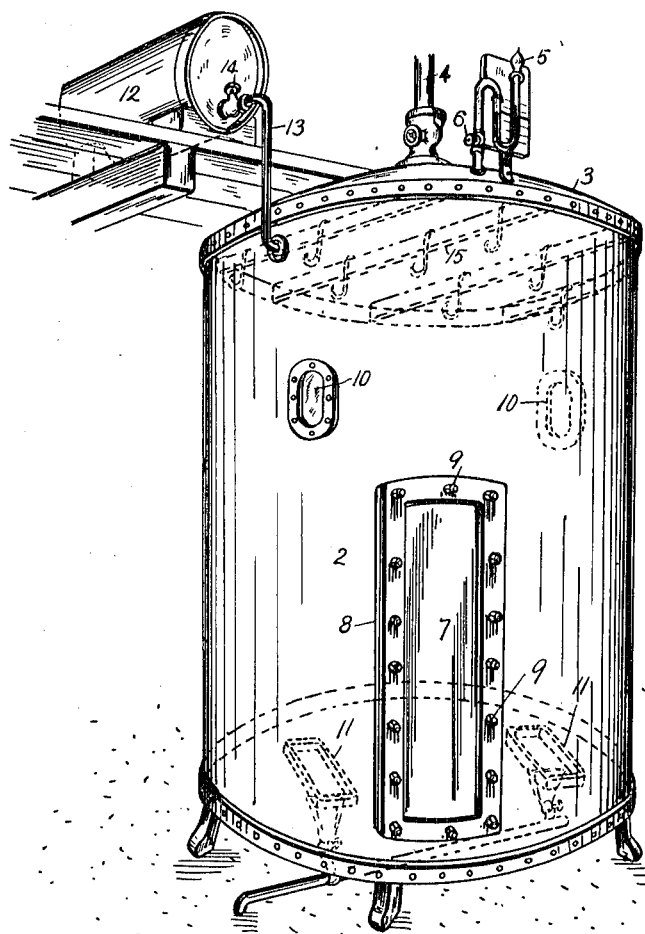

L. F. BULLÔT.
PROCESS FOR THE PRESERVATION OF ALIMENTARY SUBSTANCES SUCH AS MEAT, FISH, POULTRY, GAME, AND THE LIKE.
APPLICATION FILED MAY 29, 1913.

1,119,398.

Patented Dec. 1, 1914.

2 SHEETS—SHEET 1.

L. F. BULLÔT.
PROCESS FOR THE PRESERVATION OF ALIMENTARY SUBSTANCES SUCH AS MEAT, FISH, POULTRY, GAME, AND THE LIKE.
APPLICATION FILED MAY 29, 1913.

1,119,398.

Patented Dec. 1, 1914.

UNITED STATES PATENT OFFICE.

LOUIS FREDERICK BULLÔT, OF SYDNEY, NEW SOUTH WALES, AUSTRALIA.

PROCESS FOR THE PRESERVATION OF ALIMENTARY SUBSTANCES SUCH AS MEAT, FISH, POULTRY, GAME, AND THE LIKE.

1,119,398. Specification of Letters Patent. Patented Dec. 1, 1914.

Application filed May 29, 1913. Serial No. 770,722.

*To all whom it may concern:*

Be it known that I, LOUIS FREDERICK BULLÔT, of Builder's Exchange, 12 Castlereagh street, Sydney, in the State of New South Wales, Commonwealth of Australia, agent, have invented a certain new and useful Improvement in processes for the Preservation of Alimentary Substances such as Meat, Fish, Poultry, Game, and the like, of which the following is a specification.

This invention appertains to the known dry process for the preserving of alimentary substances such as meat, fish, poultry, game and the like, wherein the treatment is effected in two steps, firstly, in an airtight chamber by the subjection of the substances to the fumes of an admixture of vegetable charcoal, golden wattle bark, sulfur, saltpeter, extract of eucalyptus and oil of cinnamon, and secondly, by a special chilling process in a further chamber. And the present invention has been devised to effect such improvements in the process recited that not only is the preserving positively and invariably accomplished, which feature is not achieved by the beforementioned process as at present employed, but furthermore the cost factor is reduced by the elimination of the special chilling operation or cycle. And according to this invention these improvements consist firstly in fumigating the subjects with the admixture of the beforementioned known ingredients in the known proportions, viz:—

1. Vegetable charcoal ____ 8 ounces
2. Golden wattle bark ____ 4 ounces
3. Saltpeter _____ 2 ounces
4. Sulfur _____ 4 ounces
5. Extract of eucalyptus _ 1 dram
6. Oil of cinnamon _____ 1 dram the first three ingredients being in granulated form and not finely ground as hitherto proposed and the first four ingredients being thoroughly mixed, the remaining two ingredients are added. Secondly, in constructing the fumigating chamber of brick, reinforced concrete, iron or like non-porous or non-absorbent material (wood being unsuitable) and connecting to said chamber a mercury pressure gage and effecting the fumigating operation in the following manner viz:—The subjects to be treated being introduced into the chamber, and also a tray or trays containing the fumigating charge, the chamber is closed and the valve or valves in the top of the chamber being opened, heat is applied externally to the bottom of the chamber and underneath the fumigating tray, the fumes thus created will force the contained oxygen from the chamber and subjects and when the whole of the oxygen is exhausted, which will be indicated by a constant stream of the fumes from the open valve or valves, the latter will be closed rendering the chamber air tight. The chamber being fully closed the pressure of the fumes being generated therein will be indicated on the mercury gage mentioned and when the pressure reaches approximately one and a half pounds the heat application described is cut off. Thirdly, when the fumigation process carried out as described has reached the point for removing the heat, in a short period of time the pressure will commence to decrease consequent upon the absorption of the fumes by the subjects under treatment and when the pressure has decreased to half a pound of vacuum, chlorin gas is introduced into the chamber, through hygroscopic material, by any suitable means until the pressure is raised to normal or atmospheric pressure. The subjects will require to be retained in the chamber for several hours, and I have found by experiment the period for mutton is 8 hours and for beef 10 hours.

After the treatment described the subjects can be removed from the chamber but must be carefully handled until the seal is perfectly set which takes about twelve hours when for local consumption the treatment is complete.

For exporting purposes the subjects after above treatment would be kept in any approved chamber subjected to a temperature of 40 degrees Fahrenheit which treatment will maintain them fully preserved for at least three months.

Figure 2:
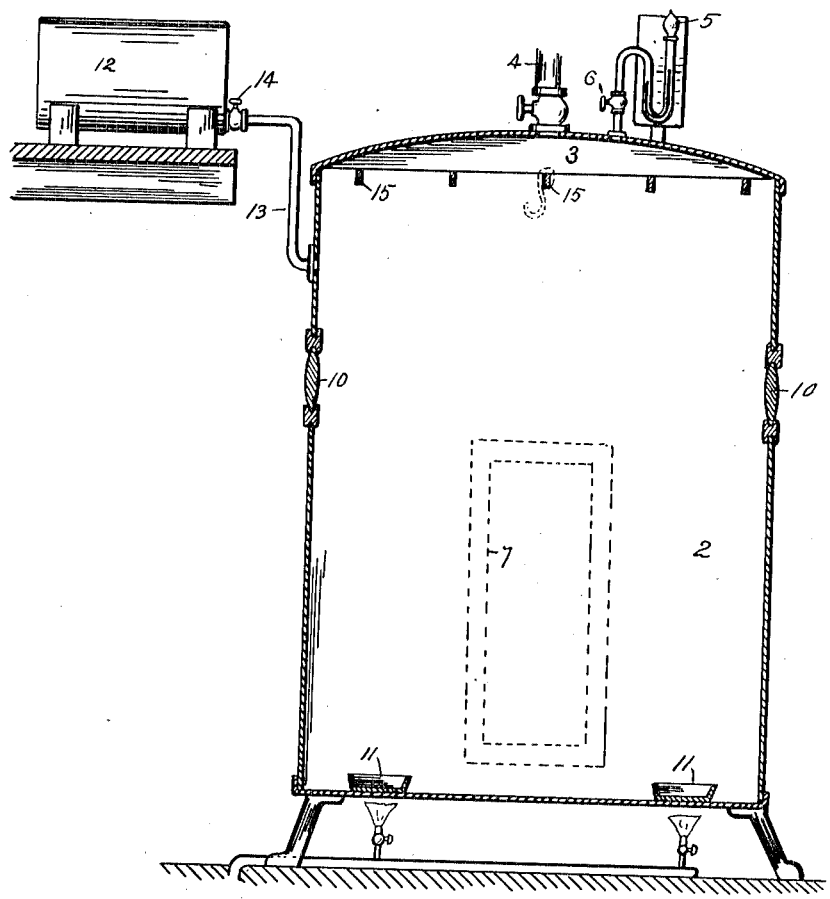

Referring to the accompanying drawings, Figure 1 is a perspective view of the fumigating chamber in accordance with the invention and Fig. 2 is a sectional elevation of the same.

In the illustration the fumigating chamber 2 has a conical top 3 so that no corners or recesses are provided within which any oxygen may be retained said top being provided with a valvular outlet pipe 4 and also with a mercury pressure gage 5 communicating therewith and controlled by the valve 6.

The door 7 of the chamber 2 is closely fitted and bears upon a strip 8 of resilient material such as rubber fitting over the holding down studs 9 the door being effectively sealed by the nuts on said studs forcing same into air tight contact with said strip 8.

The chamber 2, provided with diametrically opposite transparent insets 10 constituting peep holes for inspection of the interior to ascertain the progress of the generation of the fumes, is mounted above the floor or ground level as shown for the introduction of a suitable heating medium thereunder and underlying the trays 11 carrying the fumigating medium.

The chlorin gas drum or container 12 is positioned above the chamber 2 being connected thereto by the pipe 13 controlled by the valve 14 therein said pipe containing a lining of any suitable hygroscopic material for absorbing any moisture.

In use, the meat or other subjects to be treated are introduced into the chamber 2 and hung from the bars 15 provided near the top as shown and the tray or trays 11 containing the fumigating medium described placed on the bottom of said chamber.

The door 7, and valve 6 to mercury pressure gage 5, and valve 14 in pipe 13 connected to the chlorin gas container 12 are closed and the valve of the outlet pipe 4 being left open the process before described is proceeded with.

In the case of heavy carcasses of beef or pork requiring considerable penetration, the fumigating charge and process are repeated about two hours after the first treatment has been effected.

What I claim and desire to secure by Letters Patent of the United States is:

1. A process for preserving foods which consists in exposing the substances to be treated to the action of fumes of a mixture of charcoal, saltpeter, sulfur, golden wattle bark, extract of eucalyptus and oil of cinnamon, until all free oxygen has disappeared, while the substances are in an inclosed space, and subsequently introducing chlorin.

2. A process for preserving foods which consists in exposing the substances to be treated to the action of fumes of a mixture of charcoal, saltpeter, sulfur, golden wattle bark, extract of eucalyptus and oil of cinnamon, until all free oxygen has disappeared, and under a pressure of one and a half of a pound per square inch above atmospheric pressure, while the substances are in an inclosed space, and subsequently introducing chlorin.

3. A process for preserving foods which consists in exposing the substances to be treated to the action of fumes of a mixture of charcoal, saltpeter, sulfur, golden wattle bark, extract of eucalyptus and oil of cinnamon, until all free oxygen has disappeared, and under a pressure of one and a half of a pound per square inch above atmospheric pressure, while the substances are in an inclosed space, and subsequently introducing chlorin when the pressure is reduced to a partial vacuum of half a pound per square inch below atmospheric pressure.

Signed at Sydney, New South Wales aforesaid, the day of April 1913 in the presence of two subscribing witnesses.

LOUIS FREDERICK BULLÔT.

Witnesses:
E. B. SIGMONT,
WALTER SIGMONT.